(12) United States Patent
Chaney

(10) Patent No.: US 10,588,265 B2
(45) Date of Patent: Mar. 17, 2020

(54) INDIVIDUAL NEEDLE PROTECTION SYSTEM

(71) Applicant: Deere & Company, Moline, IL (US)

(72) Inventor: Nathan A. Chaney, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 358 days.

(21) Appl. No.: 15/672,983

(22) Filed: Aug. 9, 2017

(65) Prior Publication Data

US 2018/0116123 A1  May 3, 2018

Related U.S. Application Data

(60) Provisional application No. 62/415,130, filed on Oct. 31, 2016.

(51) Int. Cl.
| | |
|---|---|
| *A01F 15/07* | (2006.01) |
| *A01D 59/06* | (2006.01) |
| *A01F 15/14* | (2006.01) |
| *A01F 15/12* | (2006.01) |

(52) U.S. Cl.
CPC .......... *A01F 15/0715* (2013.01); *A01F 15/12* (2013.01); *A01F 15/14* (2013.01); *A01D 59/06* (2013.01); *A01F 2015/0775* (2013.01)

(58) Field of Classification Search
CPC ...... A01F 15/12; A01F 15/14; A01F 15/0715; A01F 15/0858; A01F 2015/0775; A01D 59/06; Y10T 24/1433
USPC ............................................. 100/4, 19 R, 24
See application file for complete search history.

(56) References Cited

U.S. PATENT DOCUMENTS

| | | | |
|---|---|---|---|
| 2,512,896 A | | 6/1950 | Hill et al. |
| 2,760,429 A | * | 8/1956 | Skromme ........... A01F 15/0858 |
| | | | 100/19 R |
| 3,027,825 A | * | 4/1962 | Nolt ....................... A01F 15/14 |
| | | | 100/19 R |
| 3,126,815 A | | 3/1964 | May et al. |
| 3,320,875 A | | 5/1967 | Vidrine |
| 4,102,260 A | | 7/1978 | White |
| 4,117,775 A | | 10/1978 | White et al. |
| 4,161,097 A | | 7/1979 | Vansteelant |
| 4,420,177 A | | 12/1983 | Munro et al. |
| 4,463,668 A | | 8/1984 | Jackson et al. |

(Continued)

FOREIGN PATENT DOCUMENTS

| | | |
|---|---|---|
| EP | 2944181 A1 | 11/2015 |
| EP | 3020268 A1 | 5/2016 |
| GB | 814881 A | 6/1959 |

OTHER PUBLICATIONS

European Search Report issued in counterpart application No. 17198458.6 dated Mar. 27, 2018. (7 pages).

*Primary Examiner* — Jimmy T Nguyen

(57) ABSTRACT

A binding system for an agricultural harvesting machine may include a binding mechanism securing binding material around a crop package and a delivery device coupled to the binding system and including an overload relief component. The delivery device wraps binding material around a portion of the crop package and provides binding material to the binding mechanism. The overload relief component releases the delivery device from the binding system upon encountering a predetermined overload condition.

8 Claims, 16 Drawing Sheets

(56) References Cited

U.S. PATENT DOCUMENTS

| | | |
|---|---|---|
| 7,458,620 B2 | 12/2008 | Rotole et al. |
| 9,192,104 B1 | 11/2015 | Lang et al. |
| 2009/0007805 A1 * | 1/2009 | Van Groenigen ....... A01F 15/14 100/8 |
| 2016/0128280 A1 | 5/2016 | Demulder et al. |

\* cited by examiner

INDIVIDUAL NEEDLE PROTECTION SYSTEM

CROSS-REFERENCE TO RELATED APPLICATIONS

This application claims the benefit of U.S. Provisional Application No. 62/415,130, titled Individual Needle Protection System, filed Oct. 31, 2016, which is hereby incorporated by reference in its entirety.

FIELD OF THE DISCLOSURE

The present disclosure relates to agricultural harvesting machines having a binding system for securing binding material around a crop package.

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler.

Large square balers have been used in crop harvesting for many years. Large square balers usually utilize a compression system including a gearbox with a crank arm and connecting rod which is attached to a plunger. During each rotation of the crank arm, the plunger compresses the crop in a baling chamber as the plunger moves towards the rear of the baler. Crop is usually metered from a pre-compression chamber into the baler chamber. Large square balers usually include a knotter system for tying twine around the bale before the bale is ejected from the baler chamber. Needles delivery twine through the baling chamber to the knotter system.

A problem with existing large square balers is the lack of protection when an individual needle encounters an obstruction.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system which provides protection to the components of an agricultural harvesting machine when an individual needle encounters an obstruction.

According to an aspect of the present disclosure, a binding system for an agricultural harvesting machine may include a binding mechanism securing binding material around a crop package and a delivery device coupled to the binding system and including an overload relief component. The delivery device wraps binding material around a portion of the crop package and provides binding material to the binding mechanism. The overload relief component releases the delivery device from the binding system upon encountering a predetermined overload condition.

According to an aspect of the present disclosure, an agricultural harvesting machine may include a compression chamber and a plunger having a compression surface with a channel. The plunger can move in a reciprocal motion into and out of the compression chamber to compress crop material into a crop package with the compression surface. The agricultural harvesting machine may further include a binding mechanism securing binding material around the crop package and a delivery device coupled to the agricultural harvesting machine and including an overload relief component. The delivery device moves through the channel in the plunger to wrap binding material around a portion of the crop package and provide binding material to the binding mechanism. The overload relief component releases the delivery device from the agricultural harvesting machine upon encountering a predetermined overload condition.

According to an aspect of the present disclosure, a method of operating an agricultural harvesting machine may include: forming a crop package in a bale chamber of an agricultural harvesting machine; moving a delivery device through the bale chamber to provide binding material to a binding mechanism which secures the binding material around the crop package; and releasing the delivery device from the agricultural harvesting machine when a predetermined overload condition is present.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
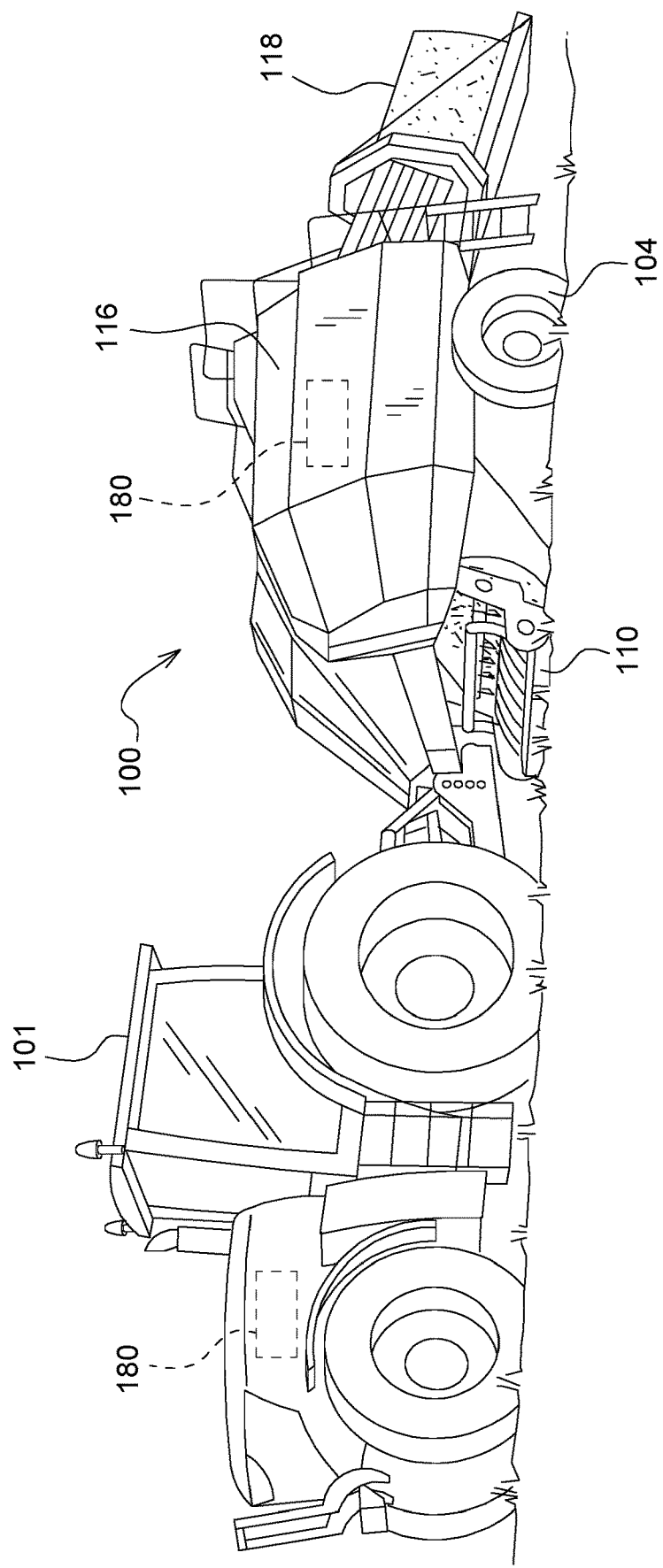
FIG. 1 is a perspective view of an agricultural harvesting machine coupled to an agricultural vehicle.

FIG. 1 illustrates an agricultural harvesting machine 100, such as a baler, according to one embodiment. Although a large square baler is shown, this disclosure also applies to other balers and harvesting machines. The agricultural harvesting machine 100 may be coupled to an agricultural vehicle 101, such as a tractor, or the agricultural harvesting machine 100 may be self-propelled. The agricultural harvesting machine 100 may be combined or integrated with a cotton harvester, a combine, or other harvesting machines. The agricultural harvesting machine 100 and the agricultural vehicle 101 may each include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

Figure 2:
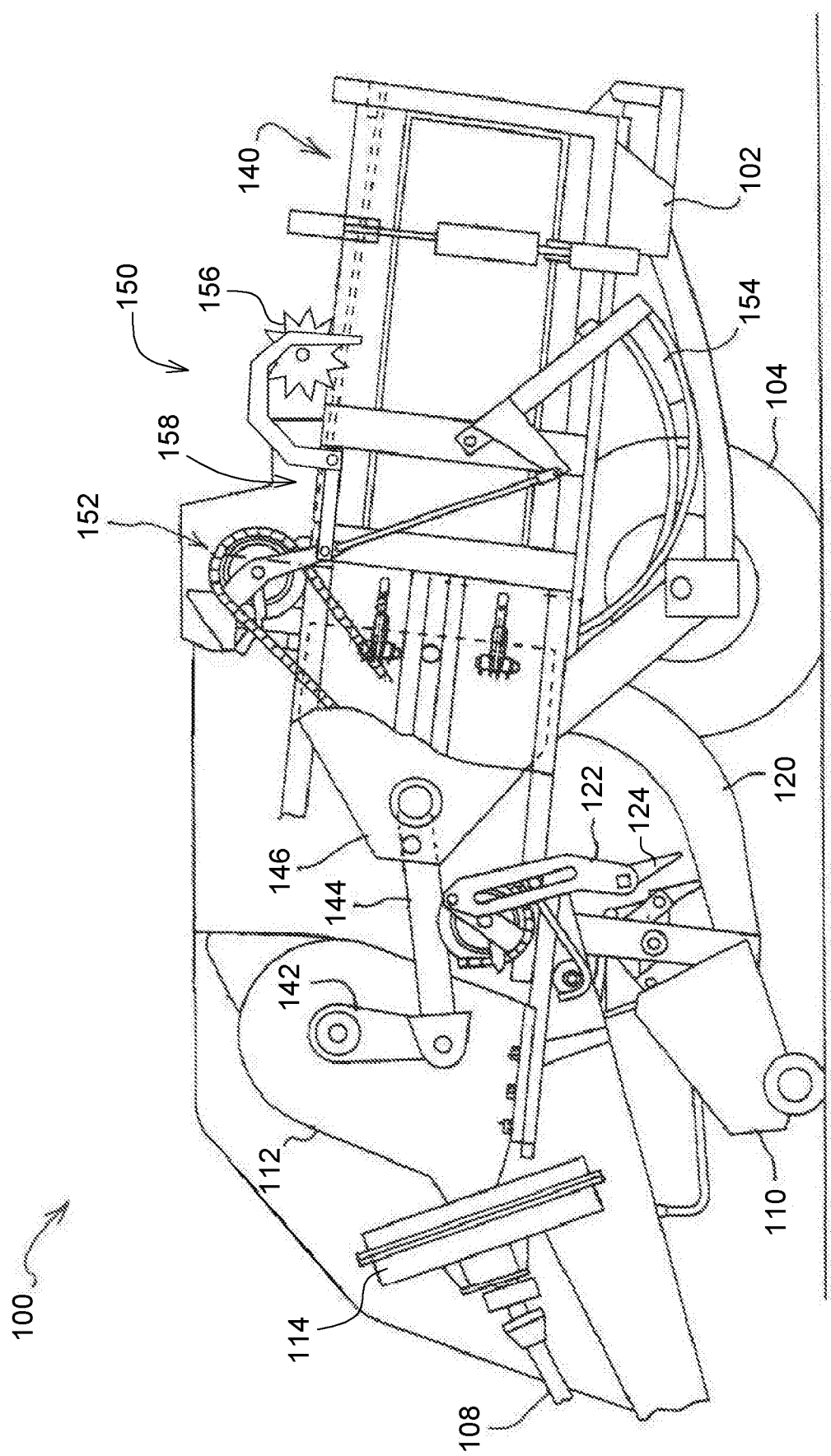
FIG. 2 is a schematic side view an agricultural harvesting machine, according to one embodiment.

With reference to FIG. 2, the baler 100 may include a frame 102, ground engaging devices 104, such as wheels, a hitch for attachment to a tractor or other vehicle, and an input shaft 108, such as a power-take-off (PTO) shaft, which can receive rotational power from a tractor 101, other vehicle agricultural vehicles, or other power sources. As depicted in the FIGURES, for example in FIG. 3, the forward portion or direction of the baler 100 is generally to the left and the rearward portion or direction of the baler 100 is generally to the right. The baler 100 may include a pick-up mechanism 110 which gathers crop material from the ground surface and feeds it into the baler 100. The pick-up mechanism 110 may include various pick-up apparatus including, but not limited to, tines, forks, augers, conveyors, baffles, a cutter or pre-cutter assembly, or any combination of the preceding. The baler 100 may include a housing 116, which generally shields various internal components of the baler 100. The input shaft or PTO shaft 108 may connect to an input of the gear train or transmission 112 providing rotational power to the baler 100 from the tractor 101 or other associated vehicle or power source. The transmission 112 may include a gearbox which converts the rotational motion of the input shaft 108 along a generally longitudinal axis of the baler 100 to a rotational motion along a generally transverse axis of the baler 100. A flywheel 114 may connect to the input shaft 108, the transmission 112, or both. The flywheel 114 can be positioned between the transmission 112 and the input shaft 108, as shown.

The baler 100 may include a pre-compression chamber 120 which receives crop material from the pick-up mechanism 110 and accumulates the crop material until a pre-determined fill condition. A loading mechanism 122, or stuffer, moves crop material into the pre-compression chamber 120. The loading mechanism 122 may include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The baler 100 may include a crank arm 142 connected to the rotational output of the transmission 112. The baler 100 may include a connecting link 144 connected between the crank arm 142 and a plunger 146. The connecting link 144 may include one or more members connecting the crank arm 142 to the plunger 146. The crank arm 142 rotates based upon the output of the transmission 112 and the plunger 146 moves in a reciprocal motion as the crank arm 142 rotates. The plunger 146 extends into the compression chamber 140 compressing the crop material and then at least partially retracts from the compression chamber 140 to allow more crop material to enter the compression chamber 140.

With reference to FIGS. 2-6, the baler 100 may include a binding or knotter system 150, which binds the compressed crop material in the compression chamber 140 into a crop package, such as a bundle or bale. The binding system 150 may include one or more binding or knotter assemblies 152 and one or more corresponding delivery devices or needles 154, which can deliver binding material to the binding assemblies 152. The binding system 150 wraps and secures a binding material around the compressed crop material, or crop package, during a binding operation. The baler 100 may include a measuring device 156, such as a star wheel, which measures the length of the compressed crop material within the compression chamber 140. The measuring device 156 may activate the binding system 150 when the compressed crop material within the compression chamber 140 reaches a desired mass, size, or length. The measuring device 156 may activate the binding assembly 152 via a mechanical trip assembly 158. The one or more binding material needles 154 may each move from a lowered position generally below or underneath the baler 100, shown for example in FIG. 4, to a raised position, as shown for example in FIG. 6, passing through a slot 139 in the bottom of the compression chamber 140, a vertically extending slot 149 in the plunger 146, and a slot 141 in the top in of the compression chamber 140. The one or more needles 154 may deliver binding material, such as string or twine, to the binding assembly 152, which secures the binding material around the compressed crop material within the compression chamber 140.

Figure 3:
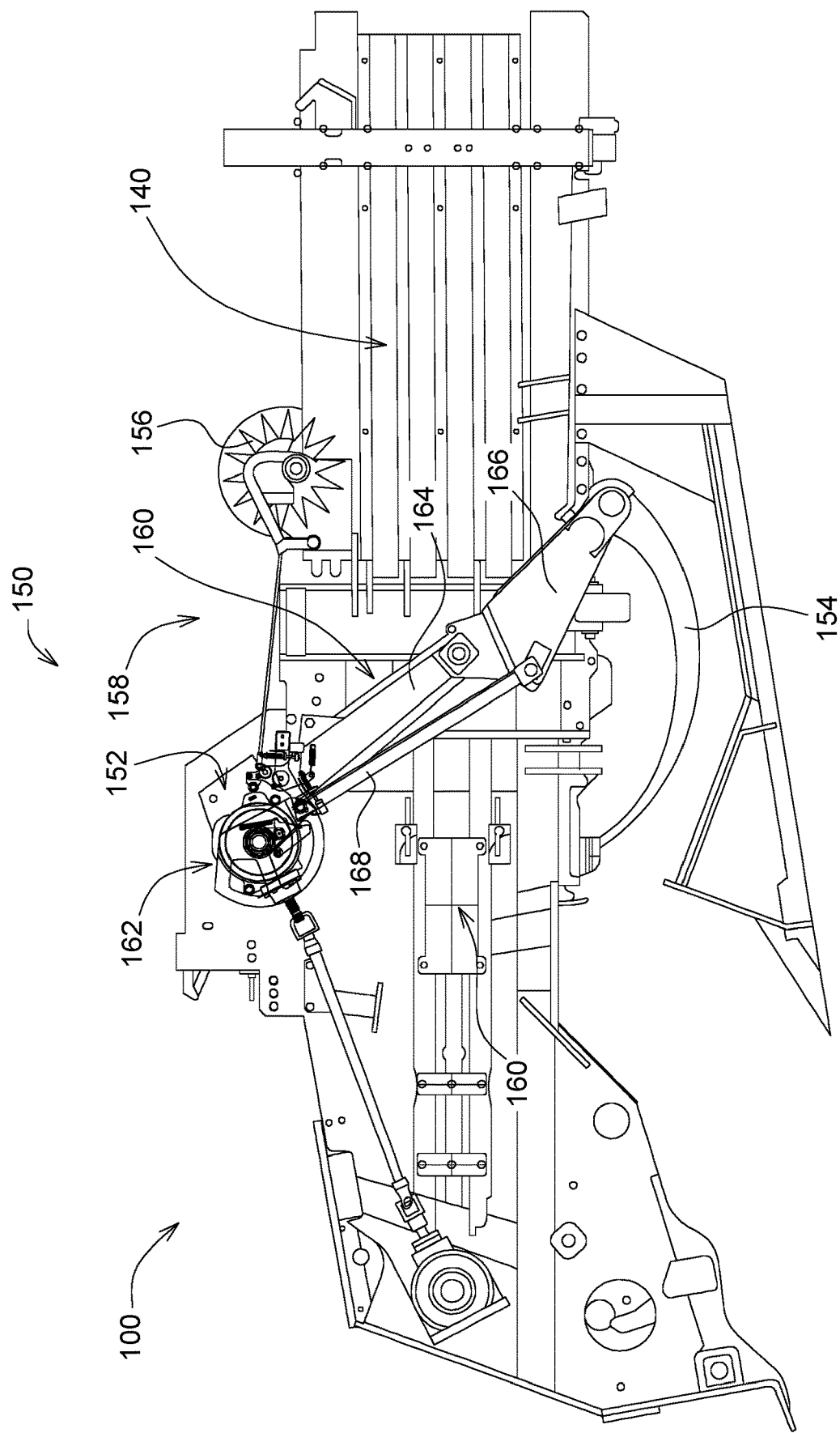
FIG. 3 is a side view of a portion of an agricultural harvesting machine, according to one embodiment.

The binding system 150 may include a delivery mechanism 160 for moving the needles 154 from the lowered position to the raised position, as shown for example in FIG. 3. The delivery mechanism 160 may include a pivoting lift arm 162 and a support member 164 which pivotally supports a delivery or needle frame 166. One or more needles 154 can be coupled to the delivery frame 166. The delivery frame 166 is coupled to the lift arm 162 by a lift link 168. When the pivoting lift arm 162 rotates, the lift link assembly 172 raises the delivery frame 166 and the coupled needles 154 from the lowered position, as shown in FIG. 4, through an intermediate position, as shown in FIG. 5, to the raised position, as shown in FIG. 6.

Figure 4:
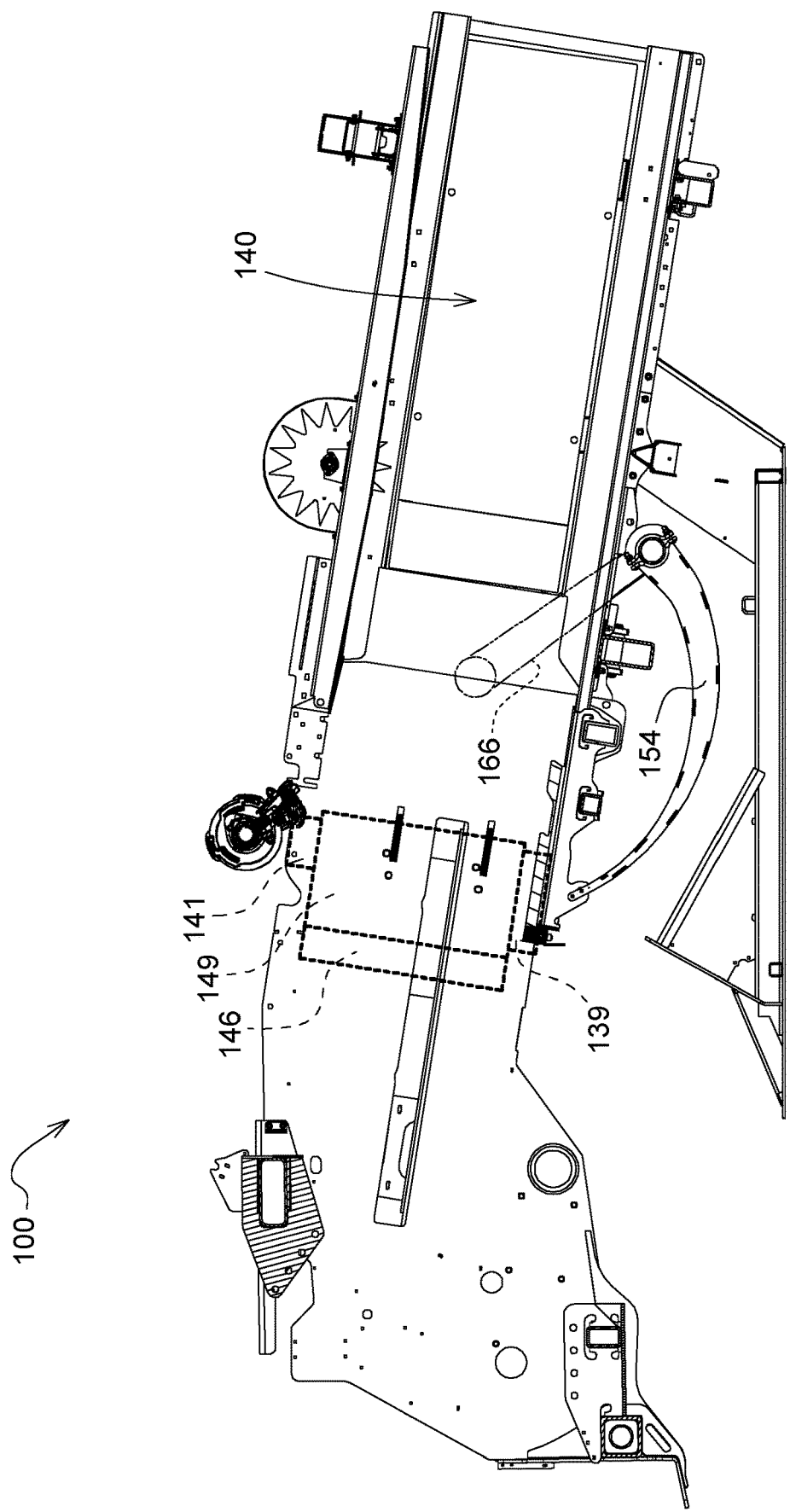
FIG. 4 is a side view of a portion of an agricultural harvesting machine, according to one embodiment.
Figure 5:
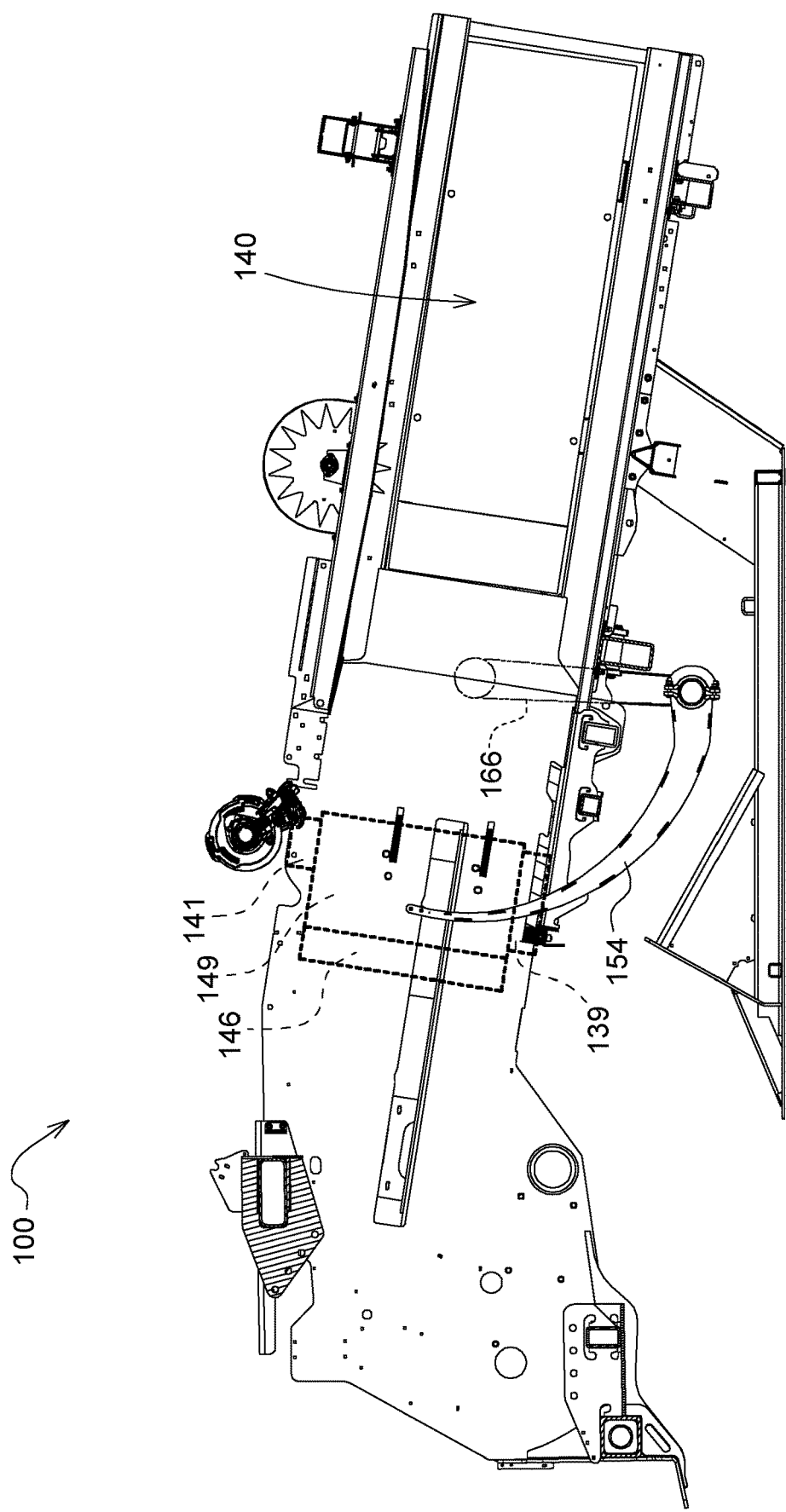
FIG. 5 is a side view of a portion of an agricultural harvesting machine, according to one embodiment.
Figure 6:
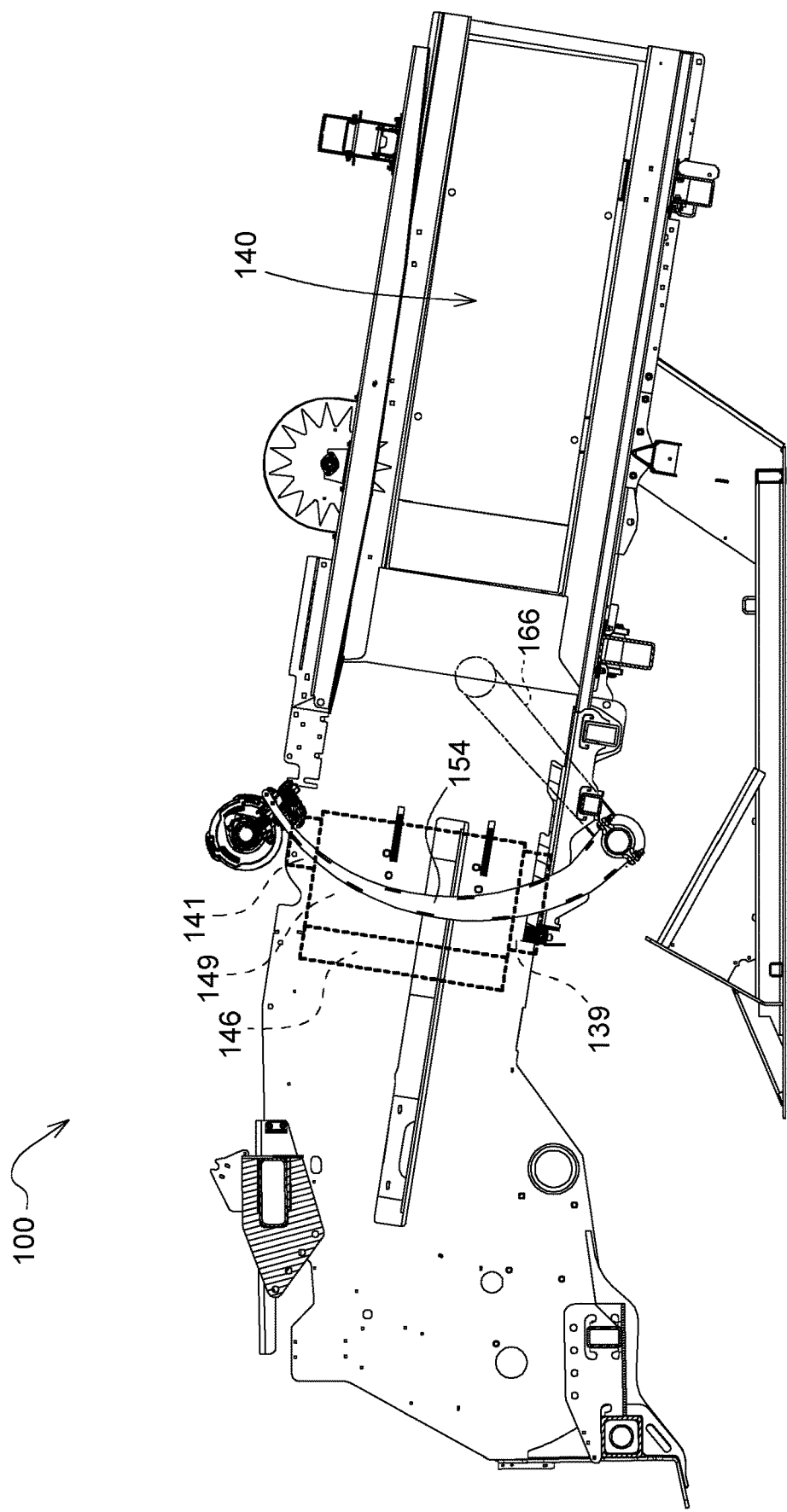
FIG. 6 is a side view of a portion of an agricultural harvesting machine, according to one embodiment.

With reference to FIGS. 4-6, the delivery device 154 wraps binding material around at least a portion of the compressed crop or crop package and provides the binding material to the binding assembly 152. The delivery device 154 remains in the lowered position as the crop material in the compression chamber 140 accumulates to pre-determined quantity, size, or amount. The binding system 150 activates and the delivery device 154 moves from the lowered position up through a slot 139 in the bottom of the compression chamber 140. The delivery device 154 continues to move upward through the compression chamber 140 in front of or forward of the crop material in the compression chamber 140. The delivery device 154 moves through a slot 149 located in a compression surface 147 of the plunger 146, which can be in contact with the crop material in the compression chamber 140. The delivery device 154 continues to move upward through the compression chamber 140 and through the slot 141 in the top of the compression chamber 140 to the binding assembly 152. The delivery device 154 delivers the binding material to the binding assembly 152, which secures the binding material around the compressed crop material within the compression chamber 140. The delivery device 154 then begins moving downward out of the slot 141 in the top of the compression chamber 140 and back through the compression chamber 140. The delivery device 154 moves downward out of slot 139 in the bottom of the compression chamber 140 and back to the lowered position.

With reference to FIGS. 7-10, the delivery device 154 may include an overload relief component 170, which activates upon a presence of one or more predetermines forces $F_1$, $F_2$. When the delivery device 154 encounters an obstruction or impediment as it raised, for example, the delivery device 154 may deform or crumple such that the delivery device 154 cannot move downward out of slot 139. The delivery device 154 may encounter an obstacle located in one of the slots 139, 141, 149 or in the compression chamber 140, which then generates the predetermined force $F_1$. The delivery device 154 could then be deformed and unable to pass through the slots 139, 141, 149 or the compression chamber 140 as it raised or lowered. The delivery device 154 may then encounter a second force $F_2$, for example from the plunger 146. Due to the one or more predetermines forces $F_1$, $F_2$, the overload relief component 170 permits the delivery device 154 to uncouple, detach, or separate from the delivery mechanism 160.

When the delivery device 154 encounters an overload condition, the overload relief component 170 can release the delivery device 154 from the delivery frame 166. The obstruction creates one or more predetermined forces $F_1$, $F_2$ acting on the delivery device 154, which activate the overload relief component 170 causing the delivery device 154 to separate from the delivery frame 166. By providing a component or system which allows an individual delivery device 154 to detach, the overload relief component 170 can protect the other delivery devices 154, the delivery mechanism 160, the transmission 112, and other baler 100 components from damage. The delivery device 154 includes a base 153 coupled to the delivery frame 166 and a tip 155, which delivers the binding material. An attachment device 172 may couple the delivery device 154 to the delivery frame 166 with one or more fasteners 174, 176. A first fastener 174 may be sized to carry a larger load and a second fastener 176 may be sized to fail at a smaller predetermined load. Alternatively, the first and second fasteners 174, 176 could be similar or substantially the same. The second fastener 176 may include a portion 177 with a reduced diameter or cross section sized to fail at a predetermined load. The base 153 of the delivery device 154 may include an arcuate convex or concave portion 171 dimensioned to cooperate with a corresponding arcuate concave or convex portion 173 of the attachment device 172. A slot 178 may extend through a portion of the base 153 and the attachment device 172. The slot 178 can be sized to allow the fastener 174 to pass through a side of the base 153 and attachment device 172, as shown for example in FIG. 10.

Figure 7:
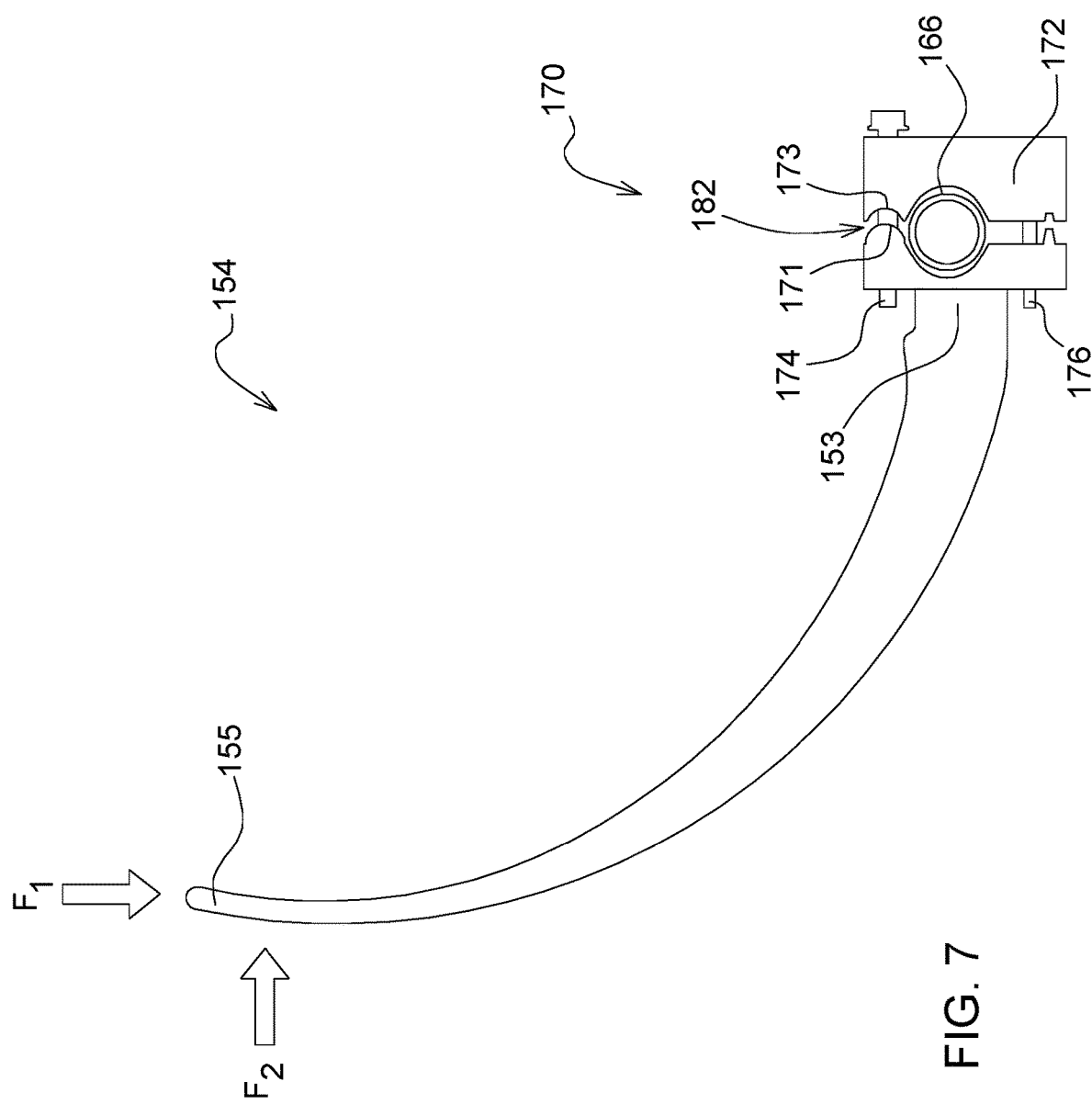
FIG. 7 is a side view of delivery device, according to one embodiment.
Figure 8:
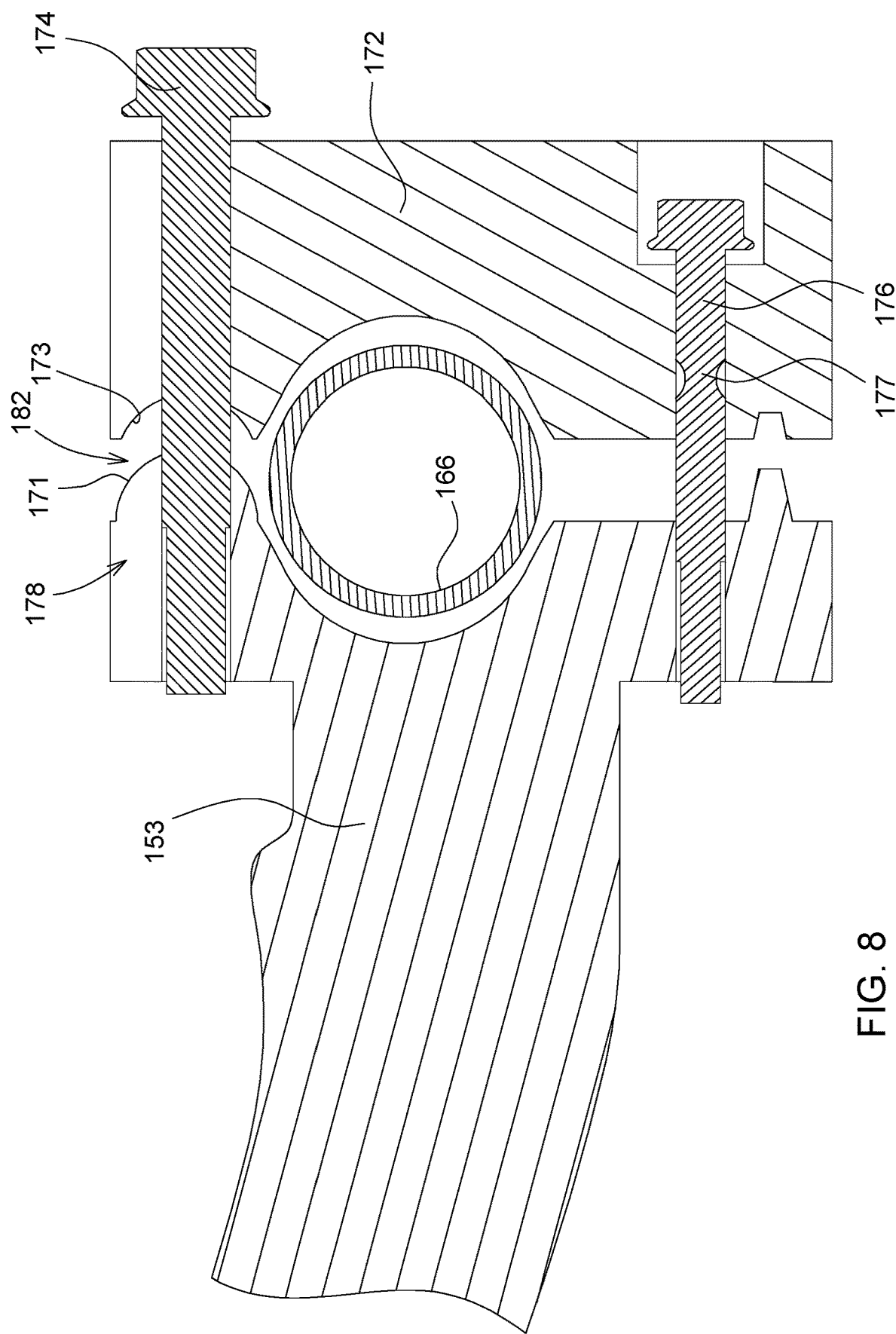
FIG. 8 is a side view of an overload relief component, according to one embodiment.
Figure 9:
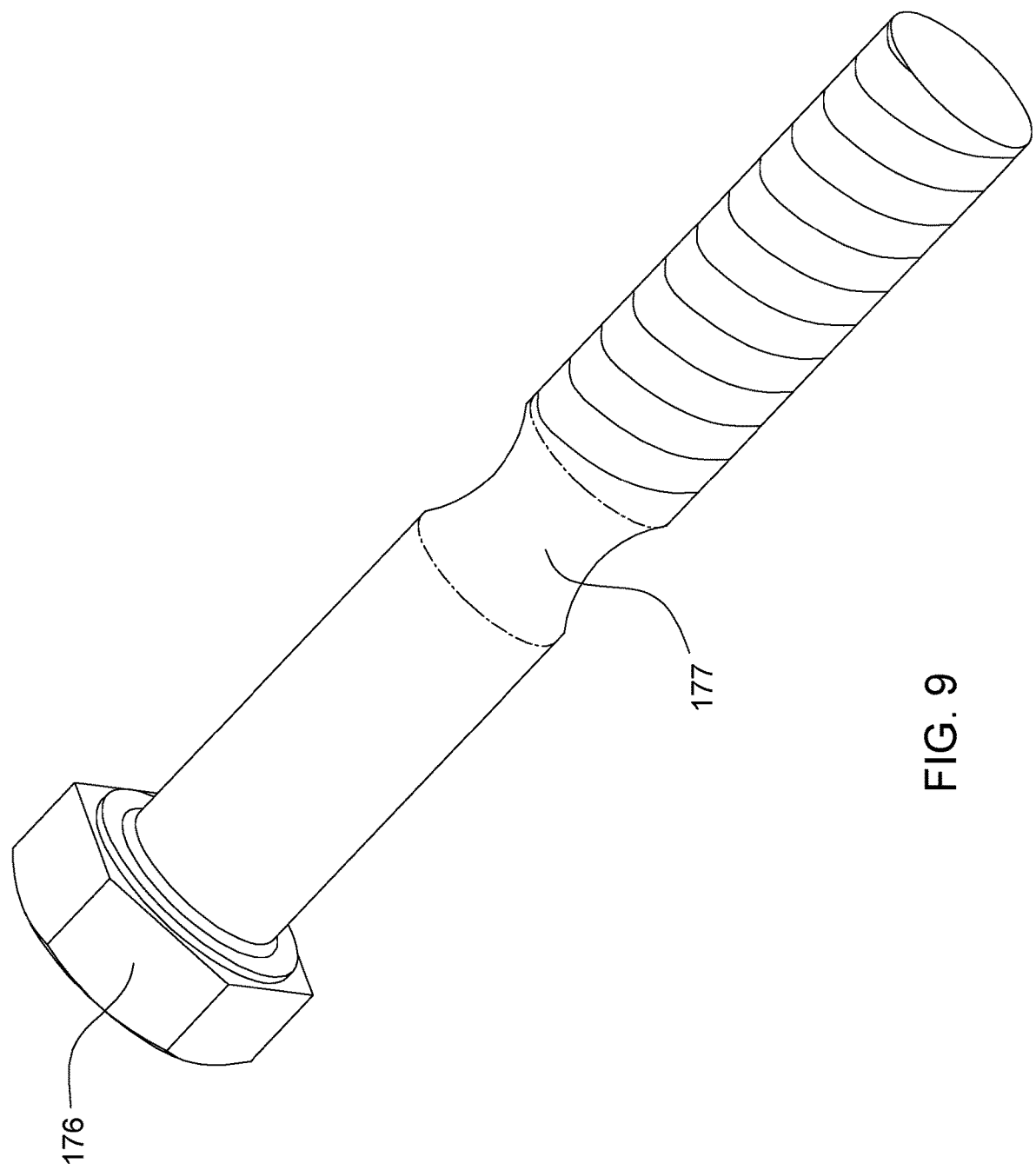
FIG. 9 is a perspective view of a fastener, according to one embodiment.
Figure 10:
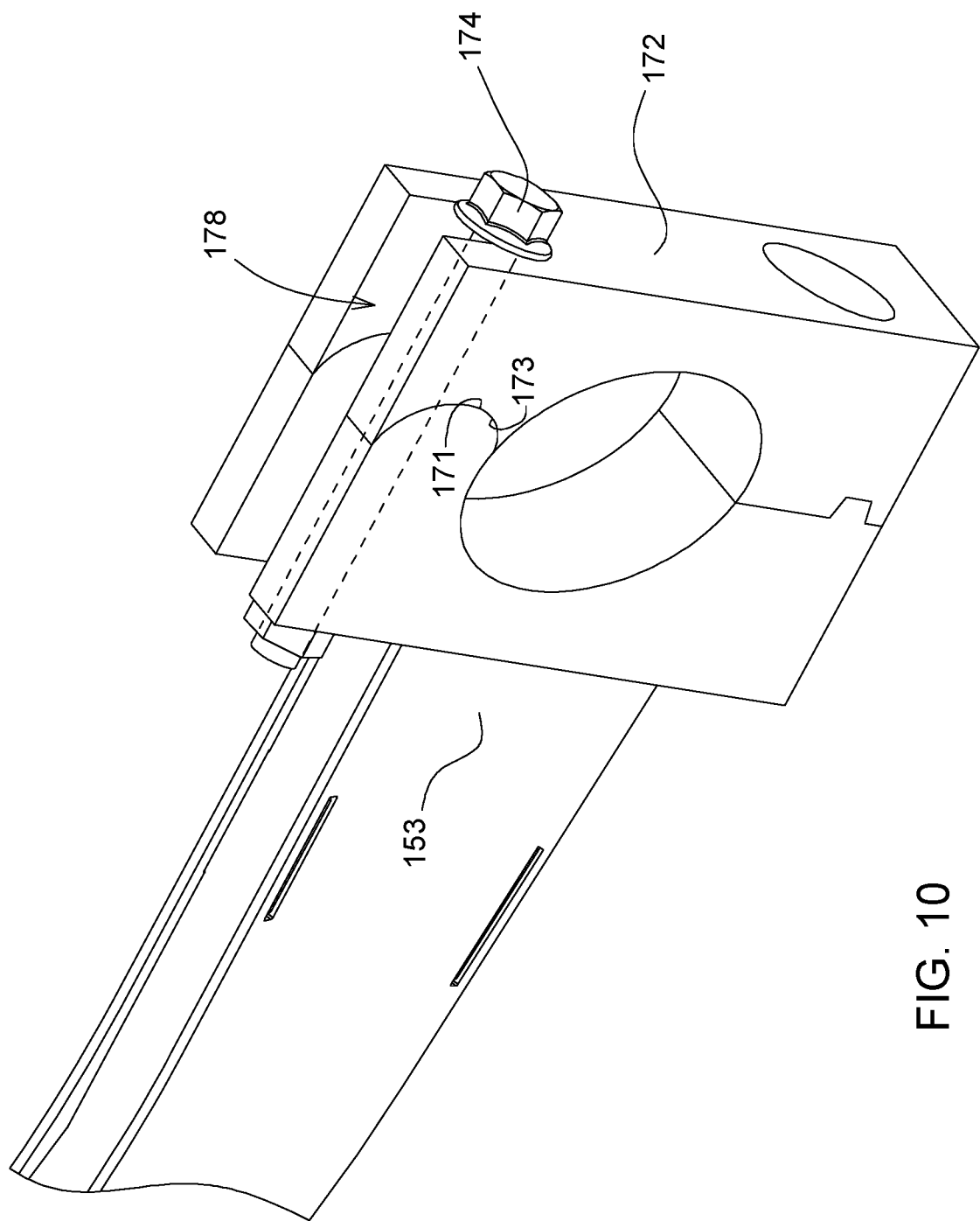
FIG. 10 is a perspective view of an overload relief component, according to one embodiment.

When the delivery device 154 encounters an overload condition resulting from the one or more predetermines forces $F_1$, $F_2$, the second fastener 176 can yield allowing the attachment device 172 to rotate counter-clockwise, or to the right in FIGS. 7-8. The convex portion 171 of the base 153 allows the concave portion 173 of the attachment device 172 to rotate or pivot counter-clockwise, which then allows the first fastener 174 to exit through slot 178 and the attachment device 172 to separate from the base 153 of the delivery device 154. Instead of using the first fastener 174, the attachment device 172 could be coupled to the delivery device 154 with a pivotal connection 182, such as a hinge. Alternatively, both the first and second fasteners 174, 176 could yield allowing the attachment device 172 to separate from the delivery device 154.

Figure 11:
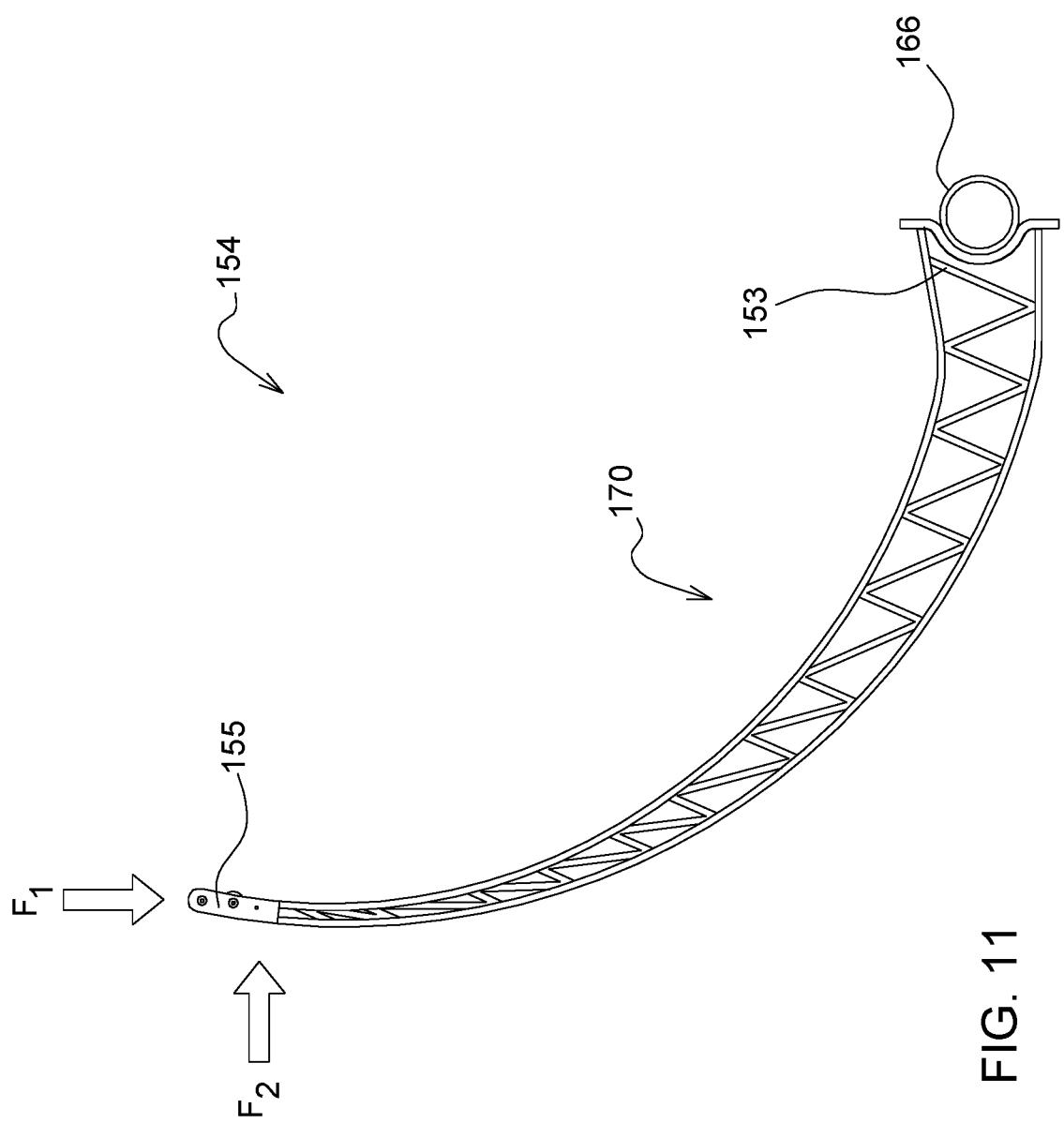
FIG. 11 is a side view of delivery device, according to one embodiment.

With reference to FIG. 11, the delivery device 154 may include a truss-like or skeletonized structure providing directional stiffness with an overload relief component 170. The delivery device 154 can be constructed from various composites such as carbon fiber and fiberglass reinforced resin, reinforced thermoplastics, and 3D printed resin or filaments. Composite construction could be implemented with any of the embodiments depicted herein.

Figure 12:
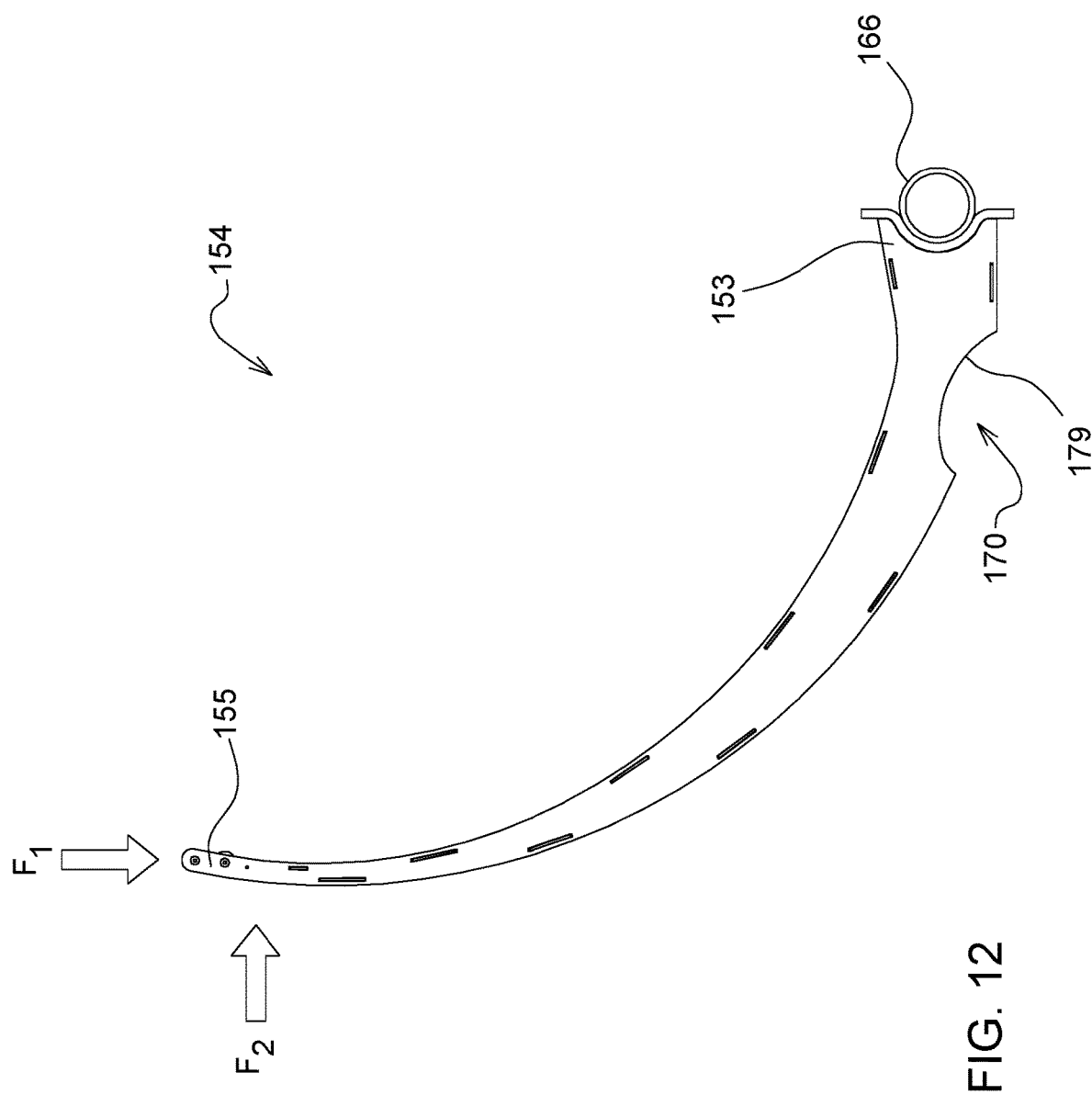
FIG. 12 is a side view of delivery device, according to one embodiment.
Figure 13:
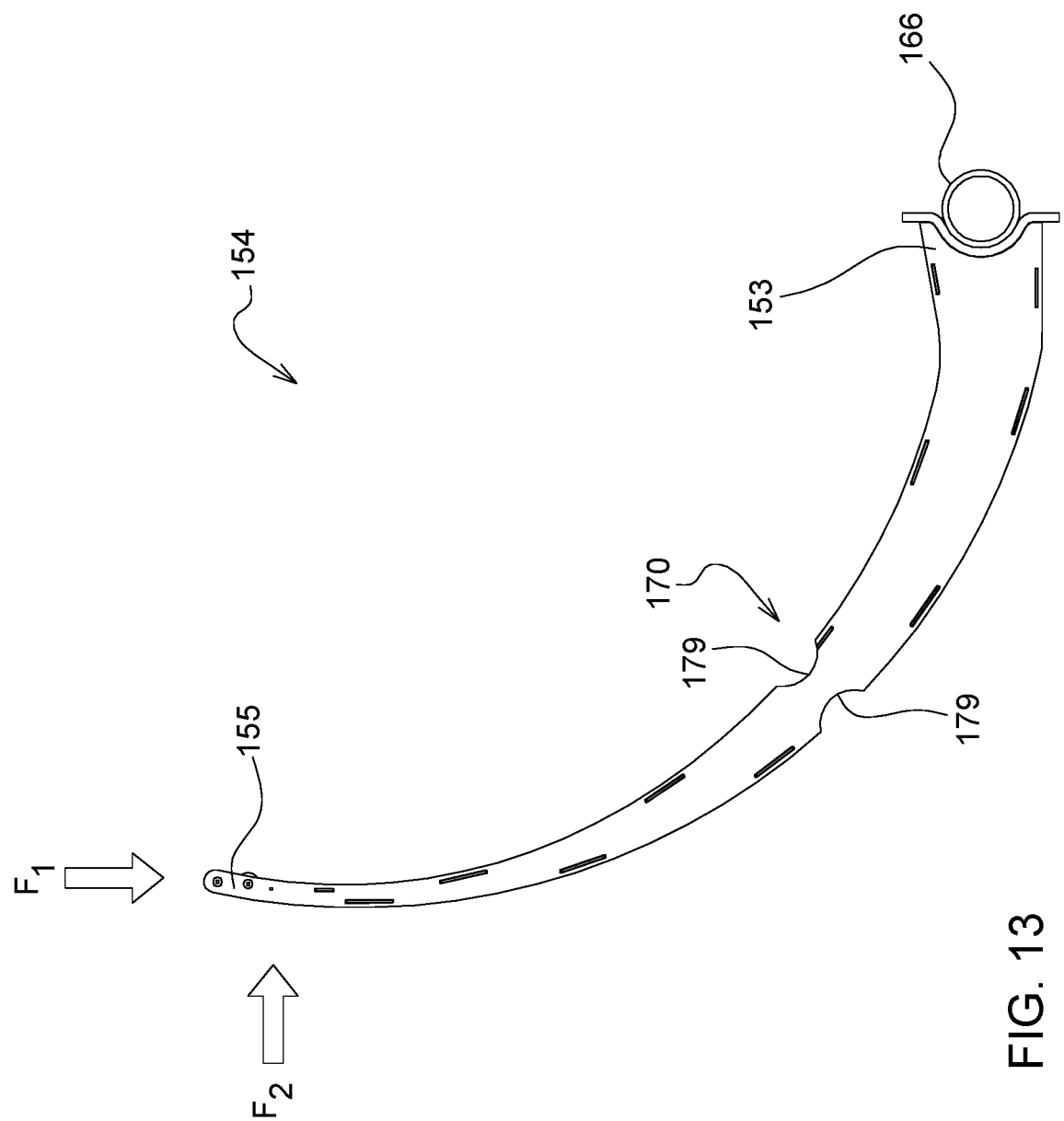
FIG. 13 is a side view of delivery device, according to one embodiment.
Figure 14:
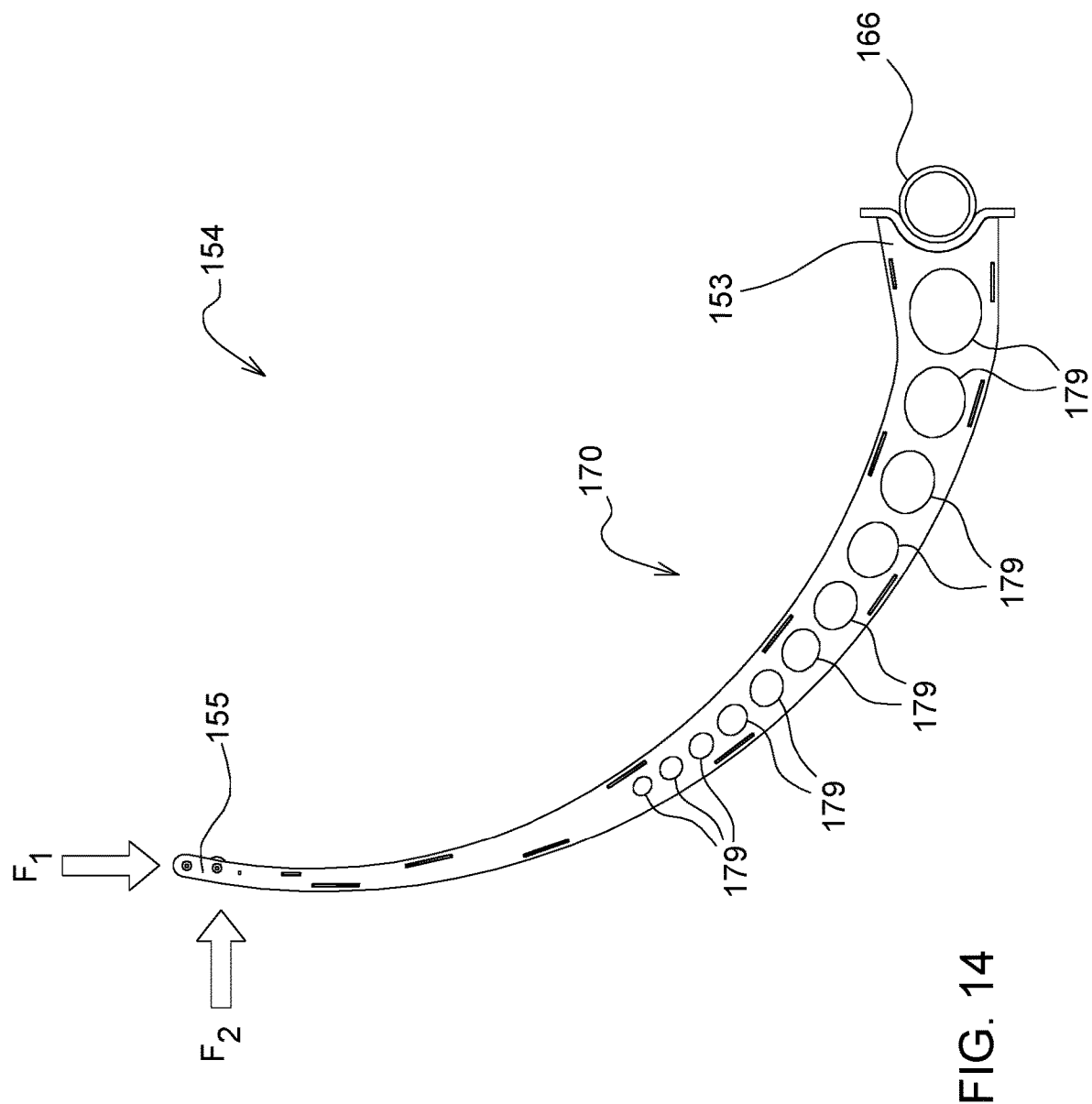
FIG. 14 is a side view of delivery device, according to one embodiment.

With reference to FIGS. 12-14, the delivery device 154 may include one or more indentations or recesses 179 resulting in a reduced cross-section. The one or more indentations or recesses 179 may be located on the outside surface, as shown for example in FIGS. 12-13, or on the inside as an aperture or opening, as shown for example in FIG. 14. The recess 179 may be located between the base 153 and the tip 155 of the delivery device 154. The cross-section at the recess 179 may include less material than a cross-section located between the recess and the base 153 and a cross-section located between the recess and the tip 155. The recess 179 can have less material than the surrounding or adjacent portions of the delivery device 154. The overload relief component 170 can include one or more recesses 179, which allow the delivery device 154 to detach or separate from the delivery frame 166 at a predetermined force or resistance F.

Figure 15:
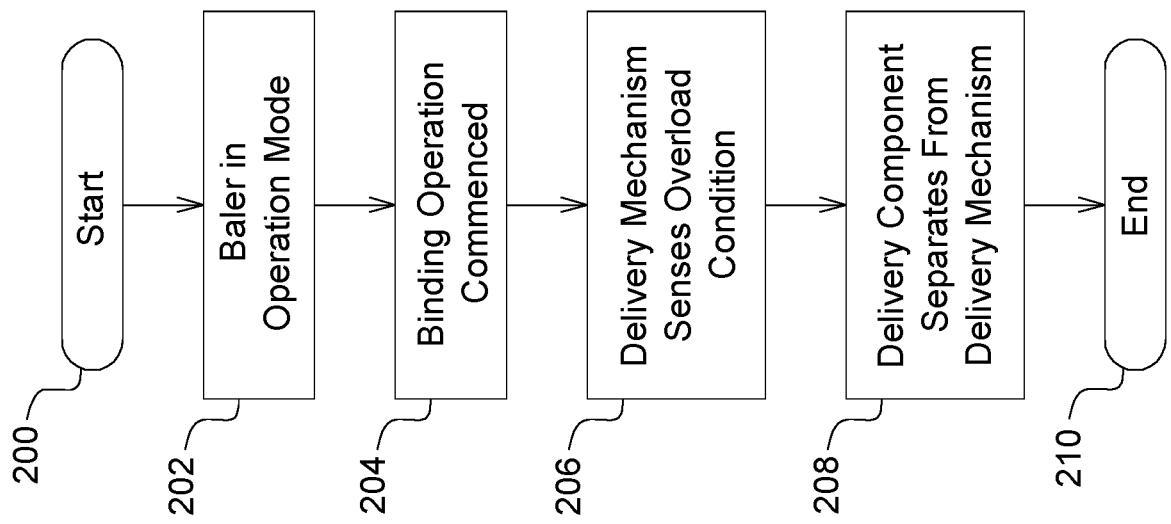
FIG. 15 is a flow chart for a method of operating an agricultural harvesting machine having an individual needle protection system, according to one embodiment.

FIG. 15 illustrates a method of operating a baler 100 having an overload relief component 170, which may be implemented in one or more of the embodiments described herein and depicted in the various FIGURES. At step 200, the method starts.

At step 202, the baler 100 is in the operation mode and crop material accumulates in the compression chamber 140.

At step 204, the binding system is activated and one or more the delivery devices 154 move from their lowered position through slots 139, 141, 149 to delivery binding material to the binding assembly 152.

At step 206, one or more of the delivery devices 154 encounter an obstruction generating an opposing force to the upward movement of the delivery devices 154.

At step 208, the overload relief component 170 releases the one or more delivery devices 154, which detach from the delivery frame 166.

At step 210, the activation of the overload relief component 170 has occurred, according to one embodiment. In other embodiments, one or more of these steps or operations may be omitted, repeated, or re-ordered and still achieve the desired results.

Figure 16:
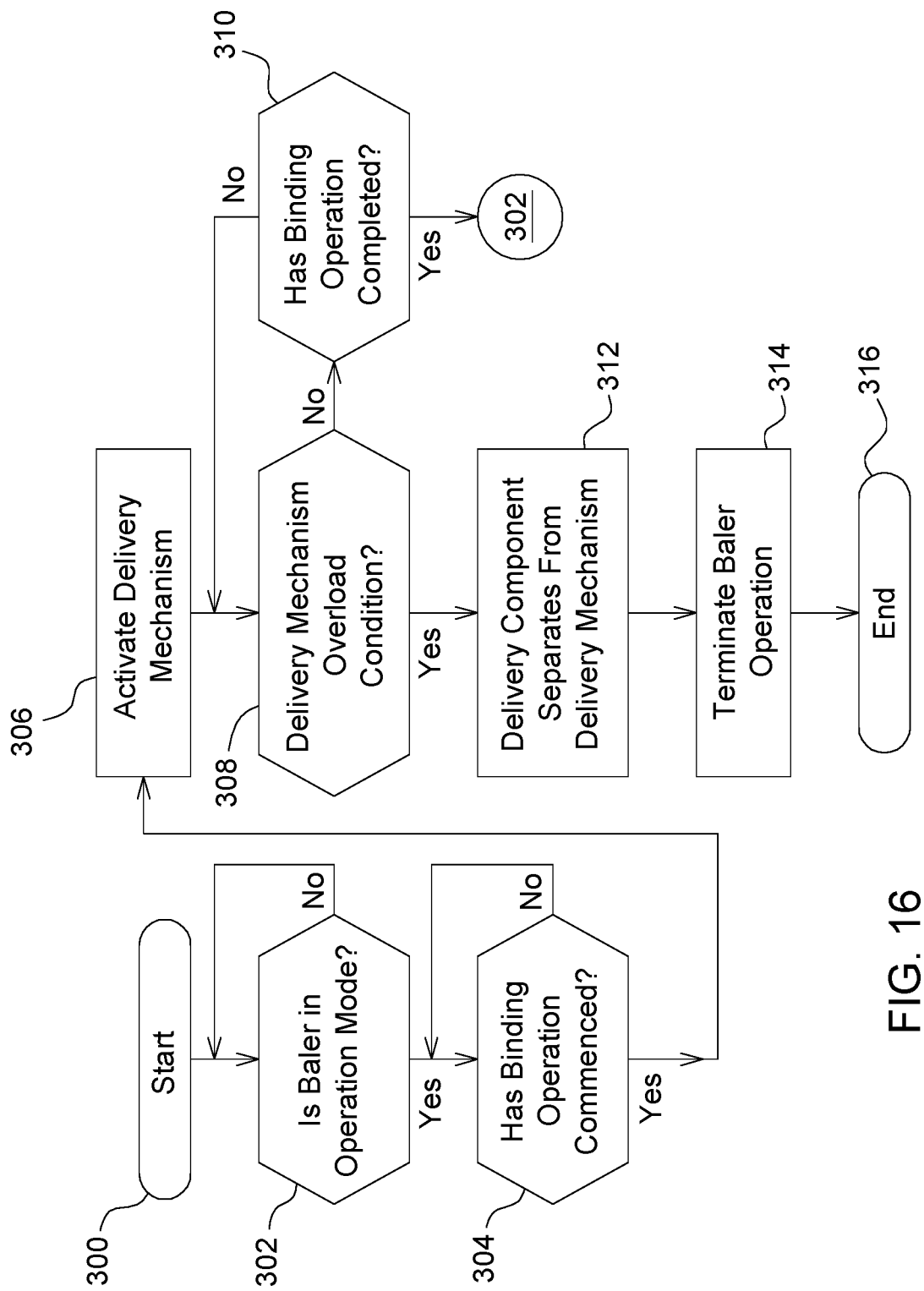
FIG. 16 is a flow chart for a method of operating an agricultural harvesting machine having an individual needle protection system, according to one embodiment.

FIG. 16 illustrates a method of operating a baler 100 having an overload relief component 170, which may be implemented in one or more of the embodiments described herein and depicted in the various FIGURES. At step 300, the method starts.

At step 302, the operational state or mode of the baler 100 is determined mechanically, electrically, or both. If the baler 100 is not in an operation mode, then the method repeats step 302. If the baler 100 is in an operation mode, then the method continues with step 304.

At step 304, the operational state or mode of the binding system 150 is determined mechanically, electrically, or both. If the binding system 150 has not activated, then repeat step 304. If the binding system 150 has activated, continue with step 306.

At step 306, the one or more delivery devices 154 are raised from their lowered position through slots 139, 141, 149 to delivery binding material to the binding assembly 152.

At step 308, an overload condition of the one or more delivery devices 154 is determined. If the overload condition is not present, then the method continues with step 310. If the overload condition is not present, then the method continues with step 312.

At step 310, the operational state or mode of the binding system 150 is determined. If the binding system 150 is still active, then the method repeats step 308. If the binding system 150 has completed, then return to 302.

At step 312, the delivery device 154 separates from the delivery mechanism 160.

At step 314, the operation of the baler 100 is terminated.

At step 316, the activation of an overload relief component 170 for a baler 100 has occurred, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is the selective detachment of an individual needle when an obstruction is encountered. Another technical effect of one or more of the example embodiments disclosed herein is the selective detachment of an individual needle when a predetermined force or resistance is encountered. Another technical effect of one or more of the example embodiments disclosed herein is a system for protecting the needle delivery mechanism by selectively detaching an individual needle which has encountered a predetermined force or resistance.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A binding system for an agricultural harvesting machine, the binding system comprising:
   a binding mechanism for securing a binding material around a crop package;
   a delivery mechanism operable to deliver the binding material to the binding mechanism, the delivery mechanism including a lift arm, a support member, a needle frame attached to the support member, a lift link interconnecting the lift arm and the needle frame, and at least one needle attached to the needle frame, wherein each respective one of the at least one needle includes:
   a base;
   an attachment device disposed opposite the base with the needle frame disposed between the base and the attachment device;
   a pivotal connection interconnecting the base and the attachment device, wherein the pivotal connection allows rotational movement between the base and the attachment device; and
   a fastener securing the attachment device to the base, wherein the fastener is operable to yield in response to a pre-determined force to allow the base to rotate relative to the attachment device and detach the respective needle from the needle frame.

2. The binding system set forth in claim 1, wherein the base includes an arcuate portion and the attachment device includes a corresponding arcuate portion disposed in mating engagement with the arcuate portion of the base to form the pivotal connection.

3. The binding system set forth in claim 2, wherein the base and the attachment device cooperate to define a slot extending through a portion of the base and the attachment device and across the pivotal connection.

4. The binding system set forth in claim 3, further comprising another fastener disposed in the slot and securing the attachment device to the base, such that the another fastener may pass through the slot as the base rotates relative to the attachment device.

5. An agricultural harvesting machine comprising:
   a compression chamber;
   a plunger having a compression surface with a channel, the plunger moving in a reciprocal motion into and out of the compression chamber to compress crop material into a crop package with the compression surface;
   a binding mechanism for securing a binding material around the crop package;
   a delivery mechanism operable to deliver the binding material to the binding mechanism, the delivery mechanism including a lift arm, a support member, a needle frame attached to the support member, a lift link interconnecting the lift arm and the needle frame, and at least one needle attached to the needle frame, wherein each respective one of the at least one needle includes:

a base;

an attachment device disposed opposite the base with the needle frame disposed between the base and the attachment device;

a pivotal connection interconnecting the base and the attachment device, wherein the pivotal connection allows rotational movement between the base and the attachment device; and a fastener securing the attachment device to the base, wherein the fastener is operable to yield in response to a pre-determined force to allow the base to rotate relative to the attachment device and detach the respective needle from the needle frame.

6. The agricultural harvesting machine set forth in claim 5, wherein the base includes an arcuate portion and the attachment device includes a corresponding arcuate portion disposed in mating engagement with the arcuate portion of the base to form the pivotal connection.

7. The agricultural harvesting machine set forth in claim 6, wherein the base and the attachment device cooperate to define a slot extending through a portion of the base and the attachment device and across the pivotal connection.

8. The agricultural harvesting machine set forth in claim 7, further comprising another fastener disposed in the slot and securing the attachment device to the base, such that the another fastener may pass through the slot as the base rotates relative to the attachment device.

* * * * *